(12) United States Patent
Morel et al.

(10) Patent No.: US 6,317,005 B1
(45) Date of Patent: Nov. 13, 2001

(54) PROCESS OF CLOCK RECOVERY DURING THE SAMPLING OF DIGITAL-TYPE SIGNALS

(75) Inventors: Philippe Morel; Thierry Tapie, both of Rennes (FR)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 09/295,502

(22) Filed: Apr. 21, 1999

(30) Foreign Application Priority Data

Apr. 23, 1998 (FR) .................................................. 98 05109

(51) Int. Cl.⁷ ................................. G09G 5/18; H03L 7/18
(52) U.S. Cl. .................................. 331/20; 331/25; 327/7; 327/156; 348/537; 375/376
(58) Field of Search ........................... 331/20, 25; 327/7, 327/156; 348/537; 375/376

(56) References Cited

U.S. PATENT DOCUMENTS 5,297,869 * 3/1994 Benham ................................. 375/361
5,657,089 8/1997 Onogawa ............................... 348/537

FOREIGN PATENT DOCUMENTS

| 0807923A1 | 11/1997 | (EP) | ................................. G09G/5/18 |
| 0519739A1 | 12/1992 | (EP) | ............................... H03L/7/091 |
| 0660611A2 | 6/1995 | (EP) | ................................. H04N/7/24 |

* cited by examiner

*Primary Examiner*—Siegfried H. Grimm
(74) *Attorney, Agent, or Firm*—Joseph S. Tripoli; Robert D. Shedd

(57) ABSTRACT

A process of clock recovery during the sampling of computer-type signals, wherein the sampling clock is generated from a phase locked loop or PLL which multiplies a given frequency by an integer number, includes gauging the position of the edges of the computer-type signals with respect to the sampling clock with the aid of an analog ramp triggered by the rising edges of the said signals in such a way as to obtain a first position-dependent value, carrying out a sampling clock phase correction and then carrying out a sampling clock frequency correction by using a processor.

24 Claims, 6 Drawing Sheets

PROCESS OF CLOCK RECOVERY DURING THE SAMPLING OF DIGITAL-TYPE SIGNALS

FIELD OF THE INVENTION

The present invention relates to a process of clock recovery during the sampling of digital-type signals, more especially a process making it possible to recover the clock during the sampling of video signals emanating from a computer device.

BACKGROUND OF THE INVENTION

The sampling of video signals emanating from an analog source is well known. It uses the Shannon-Nyquist theorem. According to this theorem, if the passband of a signal is limited to a frequency range such as [0,Fmax], it is necessary and sufficient to sample this signal at a minimum frequency 2×Fmax in order to be capable of reconstructing it from these samples. This constraint is manifested by the introduction of low-pass filters whose purpose is to limit the spectrum of the signals before sampling. In this case, the phase of the clock signal is of no importance in the sampling procedure. Indeed, the same signal sampled by two clocks of the same frequency but which are out of phase contains the same information to within a constant lag.

The same does not hold when having to sample video signals emanating from a computer device, namely, signals of digital origin. Indeed, the spectrum of these signals is very wide and they are intended to be viewed under the highest possible resolution. Accordingly, the passband must not be limited since there would be a loss of fineness. If signals of this type have to be injected into a device which comprises a sampling stage, the following problems arise:

If the inbound signal is filtered so as to limit its passband and satisfy the Nyquist criteria, the response of the filter to digital-type signals exhibiting steep transitions will engender overoscillations which are very prejudicial to the sharpness of the characters.

If the inbound signal is hardly filtered so as to avoid overoscillation, the attenuation afforded to the frequency components will be insufficient to avoid a likewise prejudicial spectral aliasing.

If the inbound signal is sampled without prior filtering, it is imperative to adopt not only the exact frequency which served to generate the signal but also a sampling phase corresponding to the middle of each porch.

The problem is all the more complex since there is no predefined fixed standard in this area. Indeed, in the displaying of video signals emanating from a graphics card, only the number of active pixels per line of the source and the number of active lines per image of the source are defined. Accordingly, the total number of pixels per line, the total number of lines as well as the image frequency and the pixel frequency are not standardized. Similarly, the phase of the first active pixel with respect to the edge of the synchronizing clock is not defined, neither linewise nor imagewise.

BRIEF DESCRIPTION OF THE INVENTION

Accordingly, the purpose of the present invention is to propose a process making it possible automatically to recover the frequency parameter and phase parameter of the sampling clock in the case of the sampling of digital-type signals, more especially of video signals emanating from a computer-type device.

The subject of the present invention is a process of clock recovery during the sampling of computer-type signals, the sampling clock being generated from a phase locked loop or PLL which multiples a given frequency by an integer number or "division rank", characterized in that it comprises the following steps:

gauging of the position of the edges of the computer-type signals with respect to the sampling clock with the aid of an analog ramp triggered by the rising edges of the computer-type signals in such a way as to obtain a first value dependent on the said position, carrying out of a sampling clock phase correction,
by comparing the first position-dependent value with a reference value in such a way as to obtain a second signed value,
by accumulating the second signed values during the given frequency,
by transforming the accumulated values into an analog value dependent on the sampling phase-shift and by applying the value thus obtained to the PLL so as to phase-shift the sampling clock, and carrying out of a frequency correction,
by measuring the alteration in the phase error between two consecutive analog ramps,
by determining and accumulating the sign of this alteration,
then, when the accumulated value exceeds a positive or negative threshold value, by sending an increment of +1 or −1 depending on the threshold value in relation to the division rank of the PLL.

According to another characteristic of the present invention, the gauging of the position of the edges of the digital-type signals is preceded by an operation of reshaping the said transitions. This reshaping is carried out by filtering the digital-type signals with the aid of a high-pass filter and by comparing the amplitude of the filtered signals with a voltage threshold. Preferably, the comparison is carried out by a voltage comparator with hysteresis and the gauging of the position of the edges is carried out by applying the analog ramp to an analog/digital converter whose clock signal is the sampling clock.

When carrying out the phase correction and in order to avoid needless operations, before the comparison, the values corresponding to an absence of utilizable transition and the values corresponding to an overly old transition, namely one prior to the current sampling period are set to the reference value.

Likewise, before carrying out the frequency correction, the values used are applied to a circuit making it possible to eliminate the zero values corresponding either to a zero phase error, or to an absence of rising transition, or to an absence of falling transition.

According to a further characteristic of the present invention, an initial division rank is calculated as a function of the standard to which the digital-type signals to be sampled belong. This prior calculation makes it possible to accelerate the convergence during correction of the sampling frequency.

Although the convergence procedure is faster on a video template consisting of a white/black alternation at the pixel frequency, this particular condition is not absolutely necessary for the proper operation of the device. Any video template exhibiting per image a number of video transitions regularly distributed along the horizontal axis of the image which is at least equal to twice the error in the division rank makes it possible to guarantee convergence, even if these transitions are distributed over several lines. Moreover, if the above criterion is not complied with (non-compliance with the Nyquist criterion) but the sampling of the phase error function takes place at instants randomly distributed along the whole of the line, convergence may also be obtained.

BRIEF DESCRIPTION OF THE DRAWINGS

Other characteristics and advantages of the present invention will become apparent on reading a preferred mode of implementation of the present invention, this description being given with reference to the appended drawings in which.

DESCRIPTION OF PREFERRED EMBODIMENTS

Figure 1:
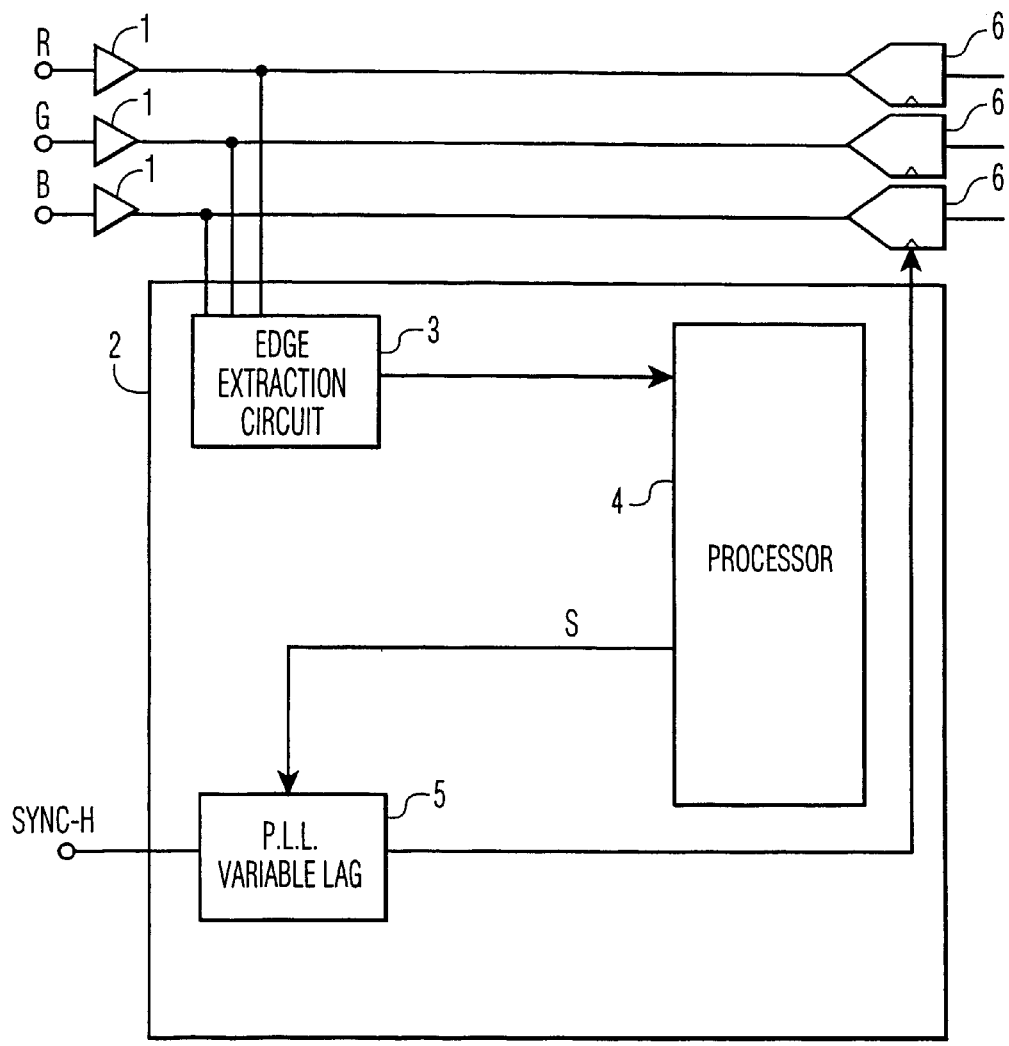
FIG. 1 is a diagrammatic representation of the main circuits used for implementing the present invention.

A circuit making it possible to implement the process of sampling clock recovery during the sampling of digital-type video signals with a view to a display in accordance with the present invention is represented diagrammatically in FIG. 1. As represented in FIG. 1, digital-type RGB video signals are amplified by amplifiers 1. They are sent to analog/digital converters 6 controlled by a sampling clock H which has been processed by the circuit 2 in such a way as to synchronize it with the input signals. Diagrammatically, the circuit 2 comprises an edge extraction circuit 3, the signal emanating from the circuit 3 is sent to a processor 4 which will output signals shown diagrammatically by the reference S corresponding to a value of division rank and to a phase correction with regard to a PLL 5 which receives as input a line synchronization signal referenced SYNC-H and which outputs the sampling clock H sent to the converters 6. In a general manner, the process of the invention therefore consists in generating the sampling clock H from a PLL which multiplies the inbound line frequency by an integer factor called the division rank. This factor will have to coincide exactly with the total number of pixels of the inbound signal. To do this, the processor 4 utilizes the position of the transitions of the inbound video which are obtained from the circuit 3. Likewise, the processor 4 can alter the phase of the sampling clock by detecting the phase variation with the aid of the signals originating from the circuit 3.

A particular embodiment of the edge extraction circuit 3 will now be described with reference to FIG. 2.

Figure 2A:
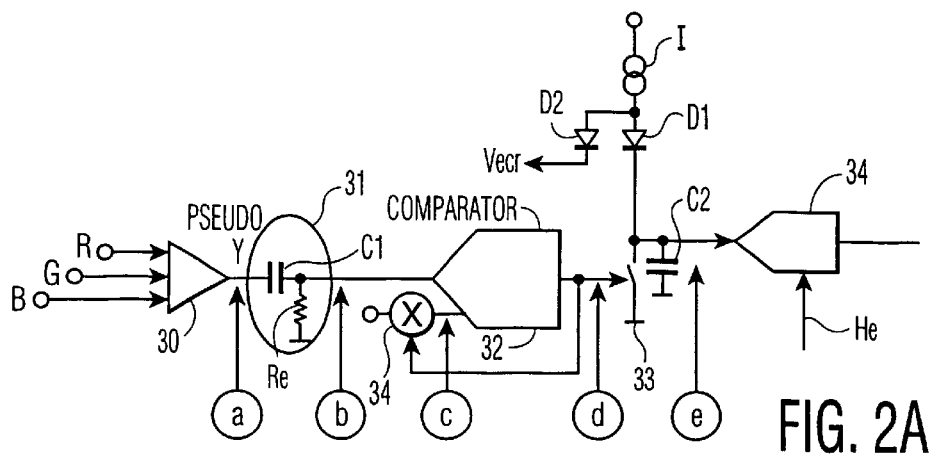
FIGS. 2A and 2B respectively represent a circuit allowing the detection of the edges and their reshaping as well as the signals applied at various points of the said circuit.

The circuit represented in FIG. 2A makes it possible to carry out two operations, namely:

the reshaping of the video transitions and, the measurement of the position of the edges with respect to the sampling clock.

Figure 2B:
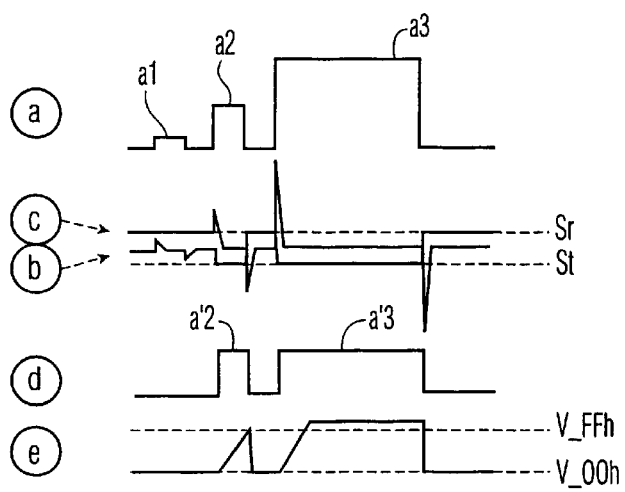

Thus, as represented in FIG. 2A, the digital-type RGB video signals are sent as input to a circuit 30 which carries out analog matricing so as to give a pseudo-luminance signal Y such that $Y=(R+G+B)/3$ The signal obtained Y is a staircase function analog type signal such as represented in FIG. 2B. It comprises pulse-like signals a1, a2, a3 exhibiting amplitudes and durations which differ depending on the luminance of the signal. The signal Y is applied to a first-order high-pass filter 31 consisting in a known manner of a capacitor C1 and a resistor Re which is mounted as a differentiator. The time constant of the differentiator is chosen, preferably, to be less than the minimum duration of the porch of the inbound signals. The signal output by the filter 31 has the shape of the signal b in FIG. 2B. The signal emanating from the high-pass filter is sent to one of the inputs of a comparator 32 whose other input receives a threshold value 34. The comparator 32 is a voltage comparator set up with hysteresis, namely the output from the comparator 32 is looped back to the second input or negative input through an adder 34. The signal applied to the second input of the comparator is represented as c in FIG. 2B. When the comparator is quiescent, the signal present at c is a threshold value Sr such that Sr>0. With the circuit described above, if the amplitude of the positive transition at the output of the differentiator 31 remains less than the threshold Sr of the comparator, the latter remains quiescent, as represented at d in FIG. 2B. Indeed, the first transition a1 being less than Sr, there is no a'1 represented at d. Conversely, if the amplitude of the positive transition at the output of the integrator 31 exceeds the threshold Sr of the comparator, the latter toggles to the working state giving as output a signal such as a'2 or a'3 in FIG. 2B. At the same time, this output signal is sent back to the negative input of the comparator 32 where it gets added to the threshold Sr, this modifying the threshold to a value St less than Sr as represented in FIG. 2B. When a negative transition is detected at the output of the integrator 31 and if this transition has an amplitude less than St, the comparator reverts to the 0 state. The operation of the comparator is clearly represented by the shape of the signals c, b, d in FIG. 2B. With this type of circuit, the video transitions of low amplitude are not taken into account by the processor 4, thus making it possible to render the system insensitive to noise. Moreover, the durations of the high and low porches at the output of the comparator are multiples of the elementary duration of each pixel porch of the inbound video.

The signals such as those represented at d in FIG. 2B are sent to circuits allowing measurement of the position of the edges. These circuits comprise a generator of current I which supplies a circuit composed of a capacitor C2 and of a switch 33. These two elements make it possible to create the analog ramp which will be applied to the analog/digital converter 34 whose clock is the sampling clock He. The circuit described above operates in the following manner. When the comparator is working, the switch 33 is open and the capacitor C2 charges up. Thus, the voltage across the terminals of the capacitor alters in a linear manner over time giving a voltage ramp. When the comparator goes quiescent, the switch 33 closes and discharges the capacitor C2, reinitializing the circuit. Thus, the start of each new ramp is synchronous with a rising transition in the useful video, as represented at e in FIG. 2B. The signal represented at e is applied to the input of the analog/digital converter 34 whose clock signal is the current sampling clock. The choice of the ratio I/C is such that, in one period of the sampling clock, the ramp makes a voltage excursion at least equal to the d.c. input swing of the converter. The signals emanating from the converter 34 are sent to the processor 4 making it possible to obtain values for the phase correction and frequency correction of the sampling clock. The analog/digital converter gives, for example, 8-bit values which therefore vary between 00 and 255.

Figure 3:
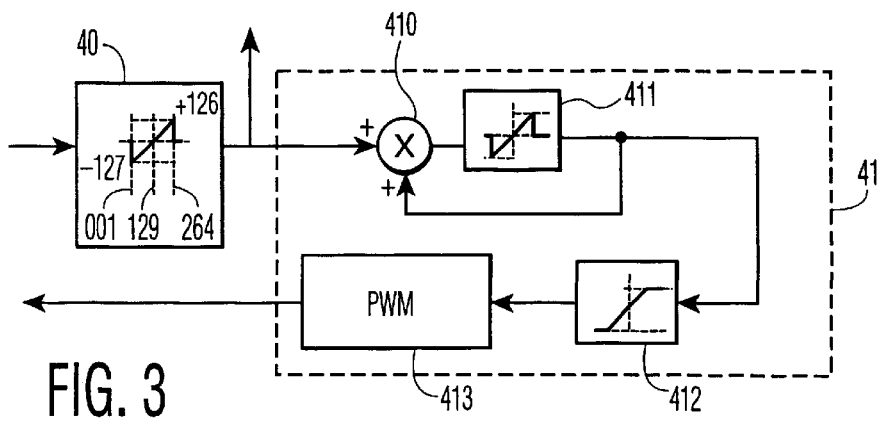
FIG. 3 diagrammatically represents a circuit for carrying out the phase correction.

An embodiment of various circuits making it possible to implement the process for carrying out phase correction of the sampling clock in accordance with the present invention will now be described with reference to FIG. 3. The phase correction is carried out by assuming that by convention the sampling phase is optimal when the analog/digital converter 34 which samples the analog ramp emanating from the circuits I and C2 samples this ramp at its half value, namely 128 in the embodiment represented. Accordingly, the phase correction circuit comprises a subtractor 40 which makes it possible to subtract the value 128 from the codes delivered by the converter 34. A signed value of the sampling phase error, namely a zero value for an optimal phase, positive for an overly late phase and negative for an overly early phase, is obtained at the output of the subtractor 40. Furthermore, the circuit 40 eliminates the values 00 which correspond to an absence of utilizable signal and the values 255 which correspond to a rising transition prior to a sampling period. To eliminate these values, they replace them by values 128. Indeed, if a considerable time interval elapses with no falling transition after a rising transition, the ramp remains frozen at its maximum value and the resulting code 255 must not be interpreted as a phase error since it is due merely to the absence of a negative transition engendering the resetting to zero of the ramp. Likewise, if a considerable time interval elapses with no rising transition after a falling transition, the ramp remains frozen at its value 00 and this code must not be interpreted as a phase error, namely a lead, since this code is due merely to the absence of a positive transition engendering the triggering of the ramp. The values emanating from the circuit 40 are sent to a circuit which carries out a signed accumulation of the said values. This circuit comprises an adder 410 which receives the output signal from the circuit 40 on one input and the output signal from the accumulator 411 on its other input. The output from the circuit 411 is also sent as input to a circuit 412 forming an attenuator which retains only the most significant bits so as to carry out the phase correction. This makes it possible to obtain good stability of the feedback control. The signals emanating from the attenuator or truncating circuit 412 are sent to a PWM (Pulse width modulation) converter 413 or a digital/analog converter whose role is to transform the truncated digital output from the accumulator into an analog voltage which will act on the phase of the phase locked loop as will be explained below.

Figure 4:
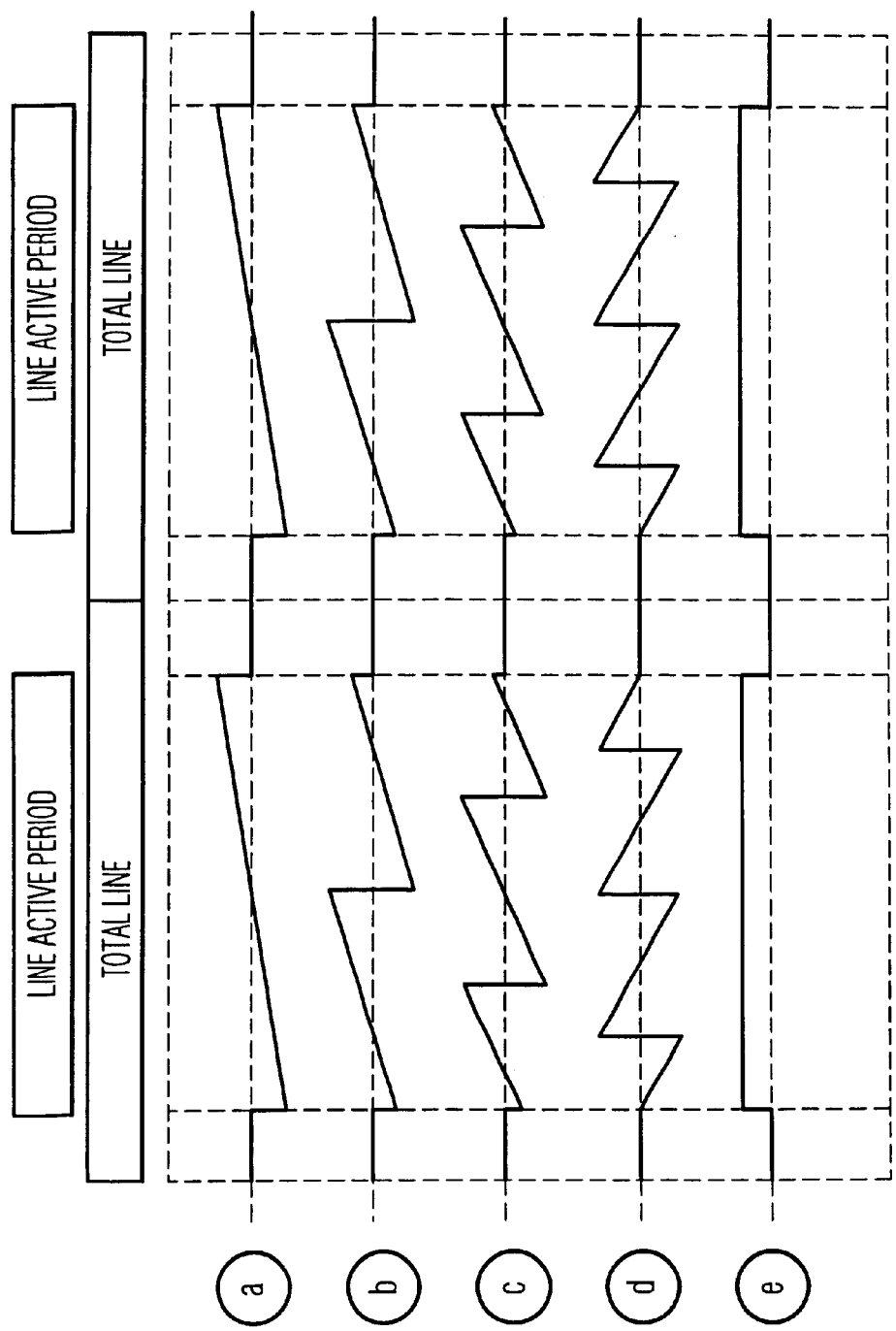
FIGS. 4 and 5 are diagrams illustrating the principle implemented in order to carry out the frequency correction of the sampling clock.
Figure 5:
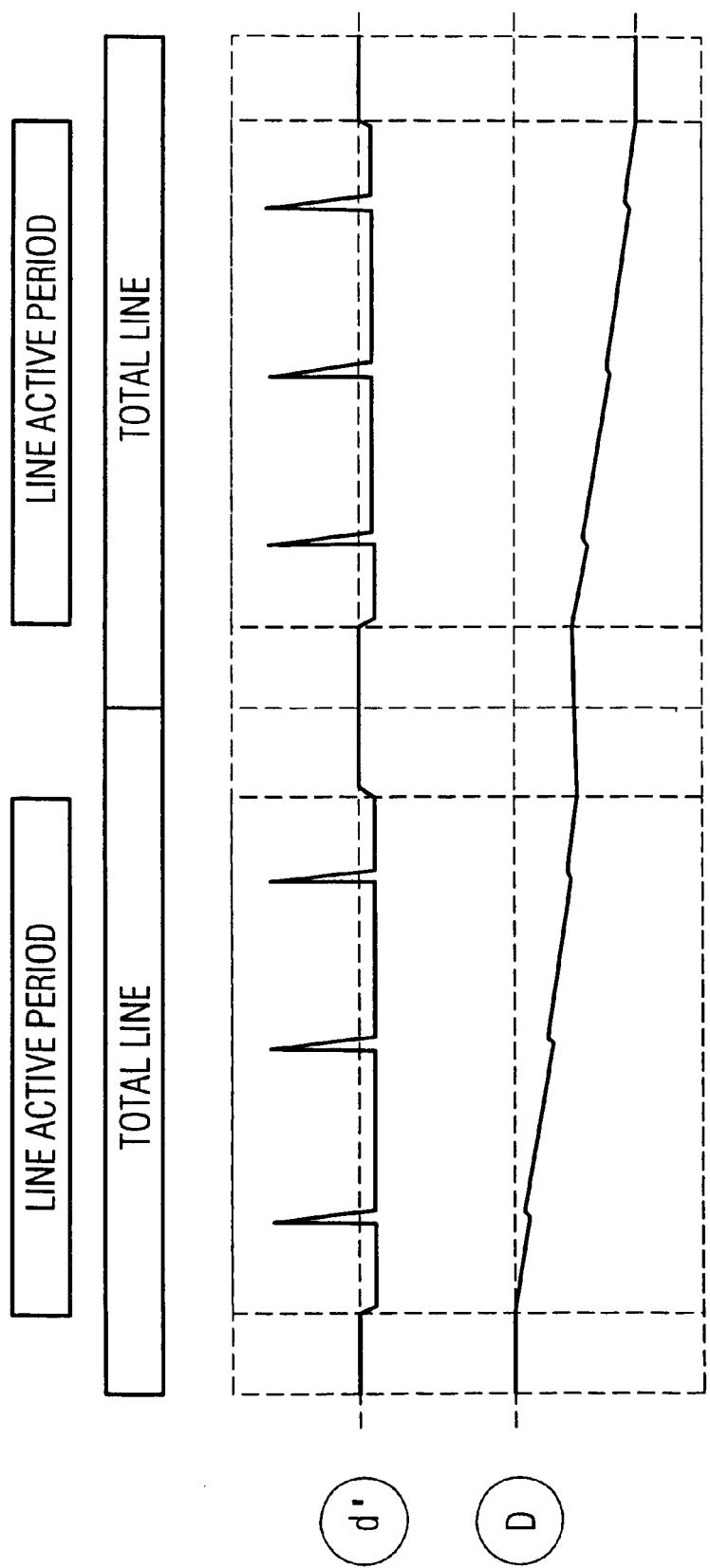

An embodiment of a circuit making it possible to carry out frequency correction of the sampling clock will now be explained with reference to FIGS. 4 to 6. FIGS. 4 and 5 illustrate the principle implemented for this frequency correction. The principle of the measurement of the position of the edges is such that, depending on the error in the current division rank, consisting of an integer value such as Erg, there exists a linewise periodic phase error function which, for this duration, exhibits a number of maxima which is close to Erg. This function can be observed such as represented in FIG. 4 in the particular case of a video template with black and white levels alternating at the pixel frequency. The curve a of FIG. 4 represents an error in the division rank of −1. In this case, the sampling clock is slower than the pixel clock. It gradually loses its lead until the middle of the line and in fact lags at the end of the line. Curve b represents an error in the division rank of −2, in this case the sampling clock is also slower than the pixel clock. It gradually loses its lead up to the first quarter of the line and takes the maximum lag at the middle of the line. This maximum lag abruptly turns into a maximum lead on account of the periodicity of the phase error function. The curve c represents an error in the division rank of −3 with a sampling clock which is slower than the pixel clock with similar explanations to those given for curve b. Curve d relates to an error in the division rank of +4. In this case, the sampling clock is faster than the pixel clock, it leads up to the ⅛ of the line with a maximum at a quarter of the line. This maximum lead turns into a maximum lag on account of the periodicity of the phase error function. Curve e relates to an error in the current division rank of 0. The case represented corresponds to a constant lag of around half the maximum lag. If a phase error is superimposed on a frequency error, the general shape of the curves is identical to within a shift along the time axis. If this simple case is considered, it is found that the sign of the error can be determined by calculating the difference between two consecutive measurements. This difference termed the "slip" is positive in cases a, b, c, negative in case d and zero in case e. The level of the stable porch of the difference is proportional to the division rank. The discontinuity in the periodic function is manifested by a signed peak which is opposite to the porch but very localized. Thus, if only the sign of the slip and not its amplitude is of interest and if this sign is accumulated in an integrator, the latter will tend to alter to high values which are either positive or negative according to the sign of the division rank. This is represented in FIG. 5 where d' represents the differentiated phase error function in the case of a division rank of +4 and D the integer of the sign of the differentiated phase error function for the same value of the division rank. This phenomenon will be used to determine the correction of the division rank to be applied to the division rank of the PLL by using circuits such as represented in FIG. 6.

Figure 6:
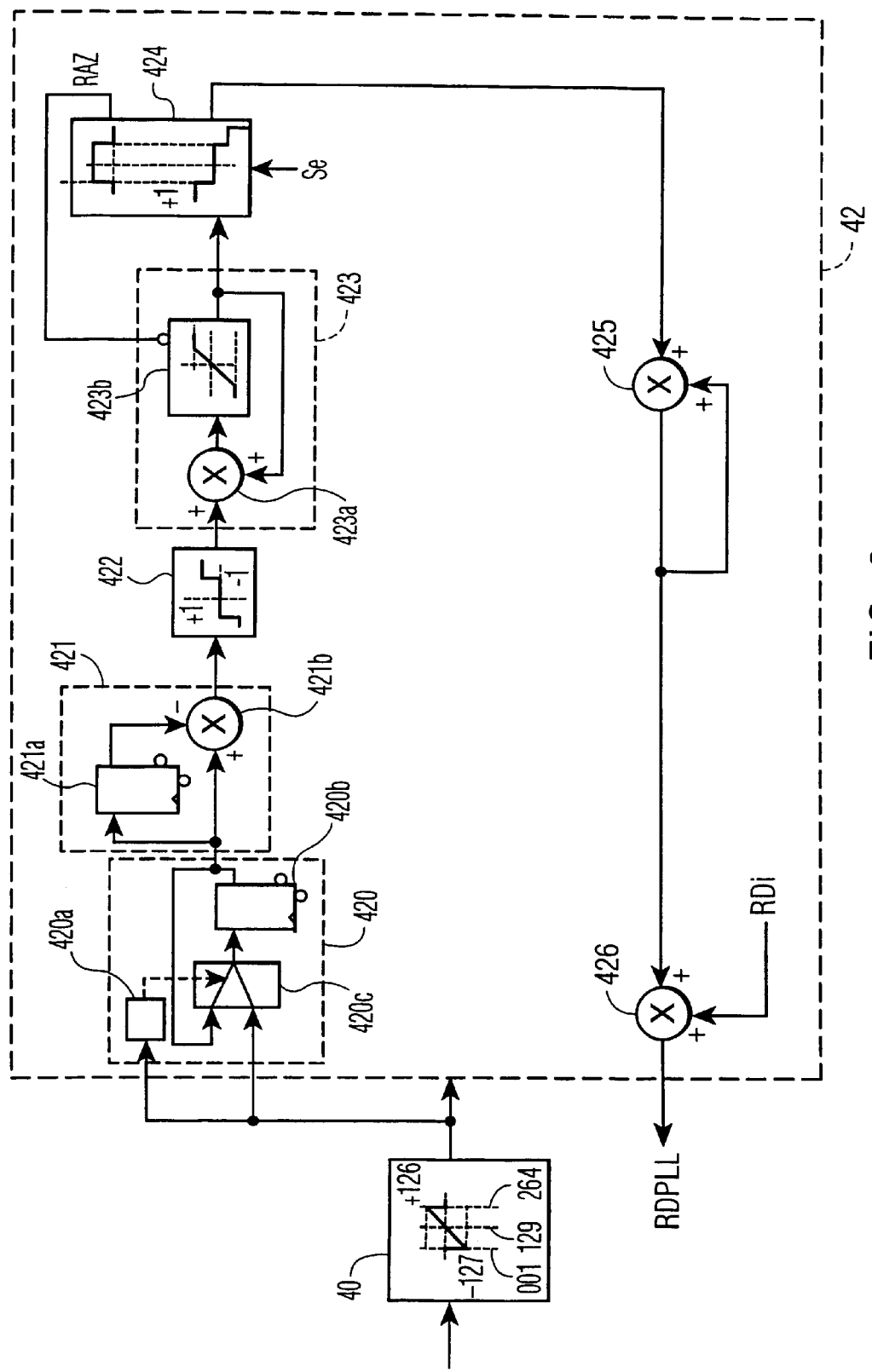
FIG. 6 diagrammatically represents the circuits used for implementing the frequency correction and, FIGS. 7 and 8 are diagrams in the form of blocks of two embodiments of a phase locked loop making it possible to implement the present invention.

As represented in FIG. 6, the circuits 42 which allow frequency correction consist primarily of a first circuit 420 for eliminating the zero values since these values which correspond either to a zero phase error, or to the absence of a ramp, or to a saturated ramp, do not make it possible to deduce any division rank error. This first stage 420 consists of a circuit 420a for decoding a 0 code, a register RD 420d and a switch 420c. The output values from the subtractor 40 are therefore copied over as output from the circuit 420 if they are ≠0. In the contrary case, the output from the circuit 420 retains the memory of the last nonzero value delivered by the subtractor 40. Next, the output from the circuit 420 is sent to a circuit for calculating differences 421. This circuit makes it possible to calculate a signed difference between the nonzero values and hence to measure the alteration in the phase error between two consecutive ramps. To do this, it comprises a register RD 421a making it possible to store values corresponding to the previous ramp whose output is connected to the minus input of a subtractor 421b which receives the direct output from the circuit 420 on its plus input. The output from the circuit 421 is sent to a thresholding circuit 422, namely a circuit which makes it possible to calculate only the sign of the value. The thresholding is carried out with a dead zone if the slip is very small, so as not to be sensitive to the fluctuations of the analog PLL and carries out a clipping to +1 or −1, since the sign of the alteration in the error is sufficient to determine the division rank, the absolute amplitude not being necessary. The +1 or −1 sign emanating from the circuit 422 is sent to a circuit 423 for accumulating the sign. This circuit consists of an adder 423a which adds the output value from the circuit 422 to the value emanating from a storage circuit 423b giving the accumulated value. The accumulator 423 will be reset to zero by a pulse RZ originating from a thresholding circuit described below. The output from the accumulation circuit 423 is sent to a thresholding circuit 424 which receives a threshold pulse Se on an input and transmits, when the threshold which may be positive or negative is exceeded, a reset-to-zero pulse RZ sent back to the circuit 423 as represented in FIG. 6. The thresholding stage 424 then delivers an incremental correction +1 or −1 to the next stage, according to whether the threshold crossed is less than 0 or greater than 0. This value is accumulated in the accumulation circuit 425 consisting of an adder whose output is looped back to one of the inputs. The output value from the adder gives the correction to be applied to the division rank of the PLL. Preferably, an initial division rank is calculated which is added to the correction of the division rank in an adder 426. This initial division rank is obtained by measuring the number of lines per image of the inbound standard. Indeed, since computer standards are characterized only by their active number of pixels and of lines, if the total number of lines is counted, it yields an item of information about the number of active lines and hence it is possible to deduce therefrom an initial estimate of the number of active pixels, based on a statistical analysis of the documentation relating to graphics cards.

|  | active pixels | active lines | total lines | initial rank |
|---|---|---|---|---|
| VGA | 640 | 480 | 480 < nlt < 600 | 820 |
| SVGA | 800 | 600 | 601 < nlt < 768 | 1048 |
| XGA | 1024 | 768 | 769 < nlt < 1024 | 1320 |
| SXGA | 1280 | 1024 | 1025 < nlt | 1708 |

Figure 7:
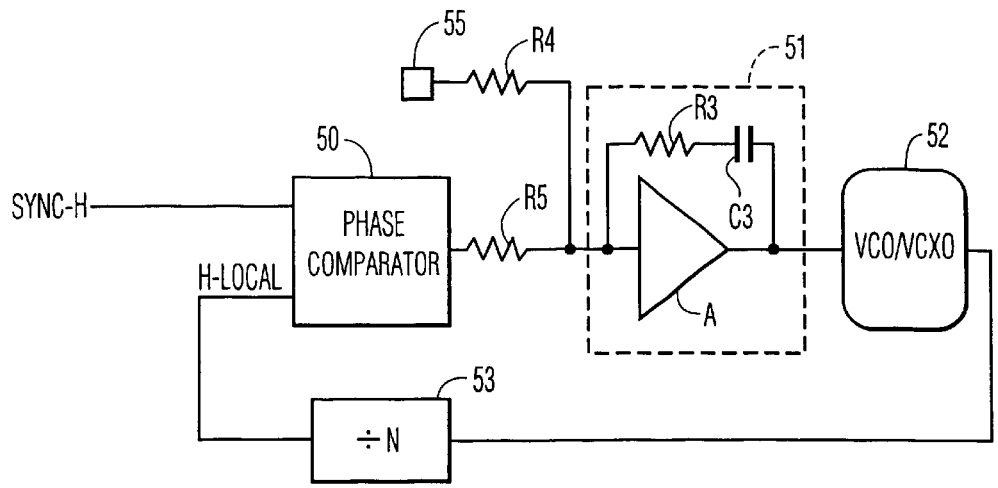
Figure 8:
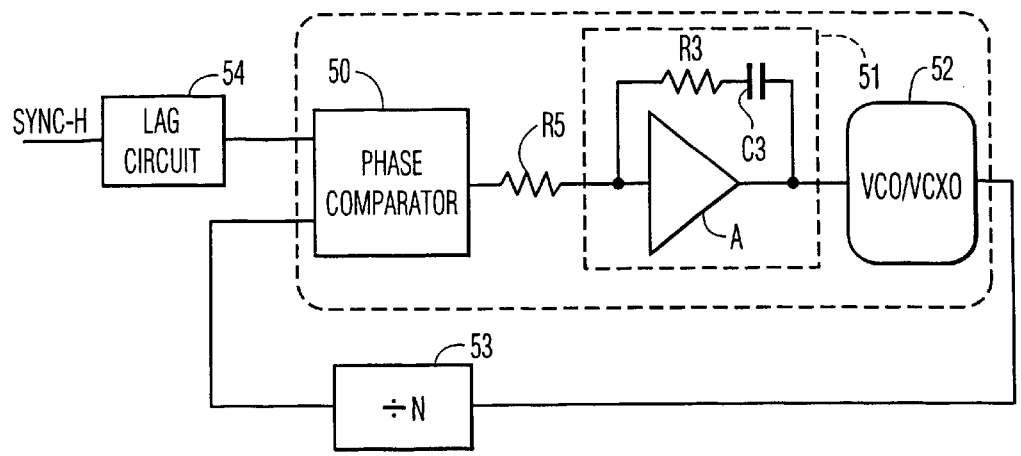

The division rank obtained (RDPLL) is therefore used in a PLL such as represented in FIGS. 7 and 8. The PLL of FIG. 7 comprises a phase comparator 50, an integrator 51 consisting of an amplifier A whose output is looped back to the input by way of a capacitor C3 in series with a resistor R3, the output of the integrator 51 is connected to a voltage-locked oscillator 52 (VCO). The output of the VCO is looped back through a circuit 53 giving the division rank in the form of an integer number (:N) on the second input of the phase comparator 50. The first input receives the inbound line sync referenced SYNC-H. To carry out the phase correction, the value obtained at the output of the circuit 3 can be applied to the terminal 55 and by way of a series resistor R4 as input to the integrator 51 so as to inject an offset current into the input of the integrator itself linked to the output of the phase comparator by way of a series resistor R5. By virtue of its almost infinite d.c. gain, the use of an integrator guarantees that the offset current deliberately injected into the output of the comparator will automatically be compensated for by a shift between the sync-H and local H signals such that the mean value of the pulsating current resulting from this shift compensates perfectly for the d.c. offset current injected.

According to another embodiment represented in FIG. 8, the phase correction can also be carried out with the aid of a controlled lag formed at the level of the circuit 54 in relation to the line synchronization signal, inbound sync H in a PLL comprising the same elements as the PLL of FIG. 7, namely a phase comparator 50 connected by a series resistor R5 at the input of an integrator 51 formed of an amplifier looped back by a circuit formed of a capacitor C3 and of a resistor R3 in series, the said integrator being connected to a voltage-controlled oscillator 52, the output of the oscillator being looped back by way of a circuit giving the integer division rank 53 to the local input of the phase comparator 50, this arrangement being used when all of the above circuits are integrated.

The process of the present invention has been described whilst referring to a particular implementing circuit which may be embodied by using a programmable component such as the component known by the name FLEX 10000 from ALTERA. However, it is obvious to the person skilled in the art that other types of processors may be used to implement the process claimed in the claims hereinbelow.

What is claimed:

1. Process of clock recovery during the sampling of computer-type signals, the sampling clock being generated from a phase locked loop or PLL which multiplies a given frequency by an integer number or "division rank", wherein the process comprises the following steps:

Gauging of the position of the edges of the computer-type signals with respect to the sampling clock with the aid of an analog ramp triggered by the rising edges of the computer-type signals in such a way as to obtain a first value dependent on the said position, carrying out of a sampling clock phase correction, by comparing the first position-dependent value with a reference value in such a way as to obtain a second signed value, by accumulating the second signed values during the given frequency, by transforming the accumulated values into an analog value dependent on the sampling phase-shift and by applying the value thus obtained to the PLL so as to phase-shift the sampling clock, and carrying out of a sampling clock frequency correction, by measuring the alteration in the phase error between two consecutive analog ramps, by determining and accumulating the sign of this alteration, then, when the accumulated value exceeds a positive or negative threshold value, by sending an increment of +1 or −1 depending on the threshold value in relation to the division rank of the PLL.

2. Process according to claim 1, wherein the gauging of the position of the edges of the digital-type signals is preceded by an operation of reshaping the said transitions.

3. Process according to claim 2, wherein the reshaping of the transitions is carried out by filtering the digital-type signals with the aid of a high-pass filter and by comparing the amplitude of the filtered signals with a voltage threshold.

4. Process according to claim 3, wherein the comparison of the amplitude of the filtered signals is carried out by a voltage comparator with hysteresis.

5. Process according to claim 1, wherein the gauging of the position of the edges is carried out by applying the analog ramp to an analog/digital converter whose clock signal is the sampling clock.

6. Process according to claim 5, wherein the comparison is carried out with the aid of a subtractor subtracting the digital value emanating from the analog/digital converter from a reference value equal to the value corresponding to half the ramp.

7. Process according to claim 6, wherein the values are coded on 8 bits, the ramp making an excursion between the values 00 and 255 and the reference value being positioned at 128.

8. Process according to claim 7, wherein, before the comparison, the values 00 attributed to an absence of utilizable transition and the values 255 corresponding to a transition prior to the current sampling period are set to the reference value.

9. Process according to claim 1, wherein the accumulation is carried out with the aid of an integrator.

10. Process according to claim 9, wherein the integrator is followed by an attenuator which retains only the most significant bits so as to carry out the phase correction.

11. Process according to claim 1, wherein the transformation of the accumulated values into an analog value dependent on the phase-shift is carried out by a PWM converter or a digital/analog converter.

12. Process according to claim 6, wherein, before carrying out the frequency correction, the signal output by the subtractor is applied to a circuit making it possible to eliminate the zero values corresponding either to a zero phase error, or to an absence of rising transition, or to an absence of falling transition.

13. Process according to claim 12, wherein, the measurement of the alteration in the phase error is carried out by subtracting the current nonzero value from the previous nonzero value in such a way as to obtain a signed value and then in comparing this value with a threshold in such a way as to obtain at output a value +1 or −1 corresponding to the sign of the alteration.

14. Process according to claim 1, wherein the values +1 or −1 are accumulated in a signed accumulation device reset to zero when it exceeds a positive or negative threshold.

15. Process according to claim 14, wherein the detection of the positive or negative threshold is carried out with the aid of a thresholding device which outputs an increment of +1 or −1.

16. Process according to claim 15, wherein the increment is accumulated in an accumulator which outputs a correction value for the division rank.

17. Process according to claim 16, wherein an initial division rank is calculated as a function of the standard to which the digital-type signals to be sampled belong.

18. Process according to claim 17, wherein the correction value is added to the initial division rank.

19. Process according to claim 1, wherein the digital-type signals are video signals emanating from a computer device to the VGA, SVGA, XGA, SXGA or similar standards.

20. Process according to claim 1, wherein, in order to accelerate the phase and frequency corrections, use is made of a video template consisting of a black/white alternation at the pixel frequency.

21. Process according to claim 1, wherein the various steps are implemented in a programmable component.

22. Process according to claim 1, wherein the PLL comprises a phase comparator whose output is connected to an integrator itself connected to a voltage-controlled oscillator whose output is looped back to the second input of the phase comparator through a divider by an integer number.

23. Process according to claim 22, wherein the value dependent on the phase-shift is applied to the input of the integrator as offset current.

24. Process according to claim 22, wherein the value dependent on the phase-shift is applied to the other input of the phase comparator as controlled lag.

\* \* \* \* \*